(12) United States Patent
Ender et al.

(10) Patent No.: US 7,114,709 B2
(45) Date of Patent: Oct. 3, 2006

(54) COMBINED LIQUID COLLECTOR AND MIXER FOR MASS TRANSFER COLUMN AND METHOD EMPLOYING SAME

(75) Inventors: Christoph Ender, Wichita, KS (US);
Darran Headley, Wichita, KS (US);
Rebecca Hooper, Wichita, KS (US);
Randy Sommerfeldt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 10/821,040

(22) Filed: Apr. 7, 2004

(65) Prior Publication Data

US 2004/0195707 A1    Oct. 7, 2004

Related U.S. Application Data

(60) Provisional application No. 60/460,966, filed on Apr. 7, 2003.

(51) Int. Cl.
*B01F 3/04* (2006.01)
(52) U.S. Cl. .................. 261/97; 261/110; 261/DIG. 44; 261/DIG. 85
(58) Field of Classification Search .................. 261/97, 261/110, 114.1, 114.2, 114.3, 114.4, 114.5, 261/DIG. 44, DIG. 85
See application file for complete search history.

(56) References Cited

U.S. PATENT DOCUMENTS

| | | | | |
|---|---|---|---|---|
| 3,290,024 A | * | 12/1966 | Huber .......................... 261/88 |
| 4,129,626 A | * | 12/1978 | Mellbom .................. 261/114.3 |
| 4,385,010 A | * | 5/1983 | Bosne .......................... 261/110 |
| 4,521,350 A | * | 6/1985 | Lefevre ....................... 261/111 |
| 4,622,183 A | * | 11/1986 | Sonnenschein et al. ...... 261/110 |
| 4,744,929 A | * | 5/1988 | Robinson et al. ............. 261/97 |
| 5,132,055 A | * | 7/1992 | Alleaume et al. .............. 261/97 |
| 5,318,732 A | | 6/1994 | Monkelbaan et al. |
| 5,464,573 A | * | 11/1995 | Tokerud et al. ................ 261/97 |

(Continued)

FOREIGN PATENT DOCUMENTS

EP    0626185    11/1994

(Continued)

*Primary Examiner*—Scott Bushey
(74) *Attorney, Agent, or Firm*—Hovey Williams LLP

(57) ABSTRACT

A collector is used to collect and mix liquid from an overlying zone in a mass transfer column in which fluid streams are processed, such as to obtain fractionation products. The collector has two or more liquid collection regions and two or more sumps positioned about the perimeter of the liquid collection regions. A plurality of channels and deflectors are spaced apart within each liquid collection region and vapor passages are formed in the spacings between adjacent channels. The deflectors direct descending liquid into the channels and shield the vapor passages from the descending liquid. The channels within each liquid collection region are arranged into interspersed sets, with one set of channels preferentially directing collected liquid into one sump and another set of channels preferentially directing collected liquid into another sump. Preferably, roughly equal amounts of liquid from each liquid collection region are deliver to the two sumps so that liquid in the sumps is of a more uniform concentration and composition. One or more of the sumps includes a downcomer for directing the liquid from the sump to an underlying zone. By mixing the liquid within the collector, the use of a separate mixing device can be avoided. As a result, vertical space in the column that would normally be occupied by the mixing device can be filled with packing or other internals to increase the efficiency of the column.

41 Claims, 8 Drawing Sheets

U.S. PATENT DOCUMENTS

| | | |
|---|---|---|
| 5,645,770 A * | 7/1997 | McNulty et al. ............... 261/97 |
| 6,086,055 A * | 7/2000 | Armstrong et al. ........... 261/96 |
| 2001/0038155 A1 | 11/2001 | Bachmann et al. |
| 2002/0079597 A1* | 6/2002 | Bartlok ........................ 261/97 |

FOREIGN PATENT DOCUMENTS

| | | |
|---|---|---|
| WO | WO 96/28232 | 9/1996 |

* cited by examiner

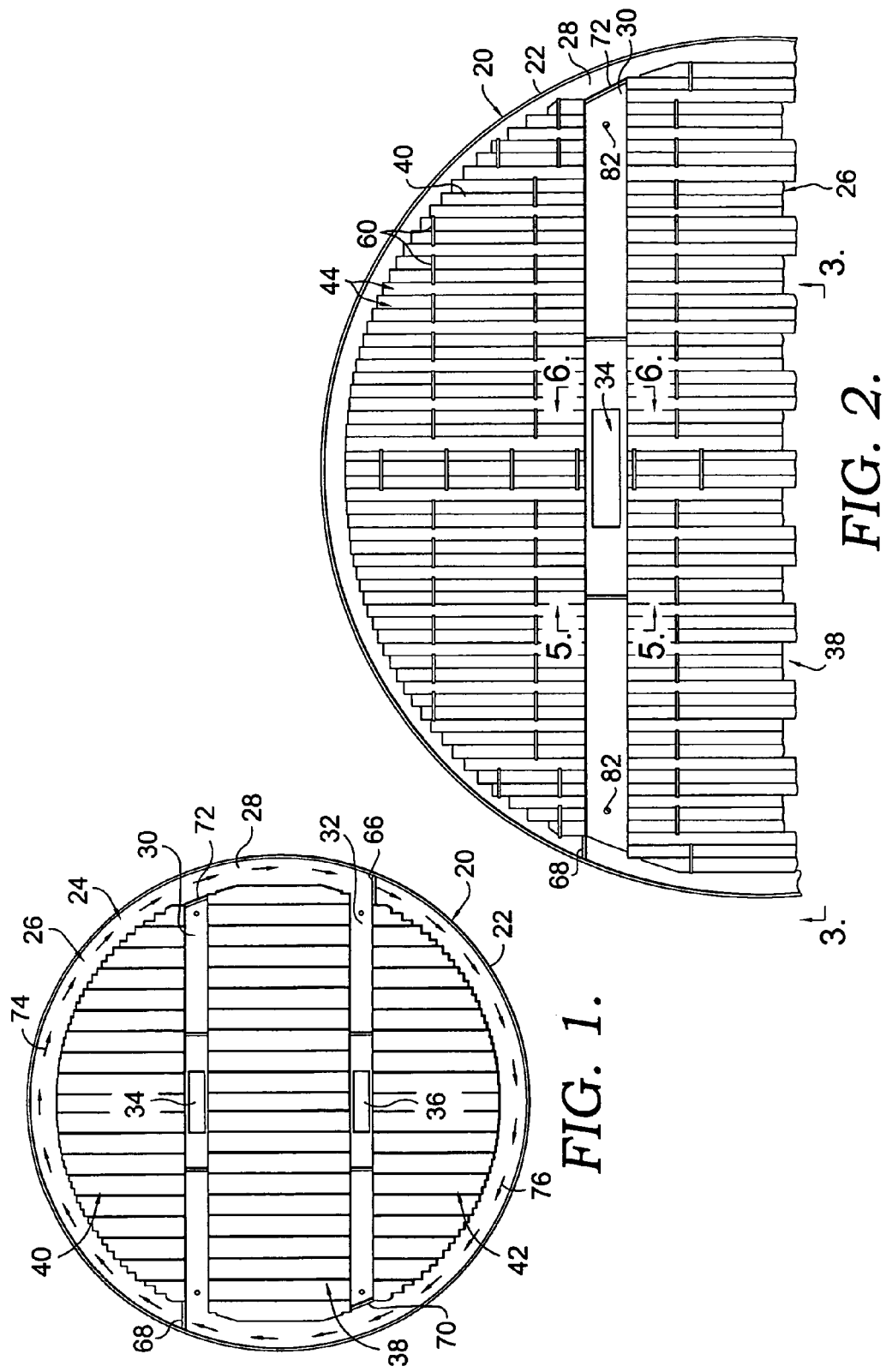

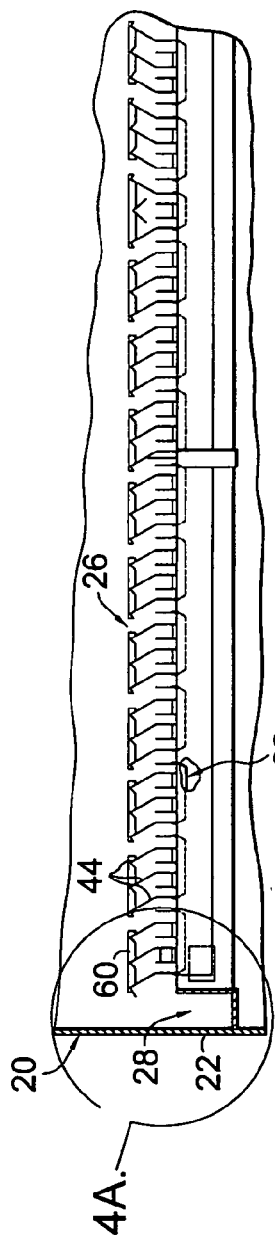
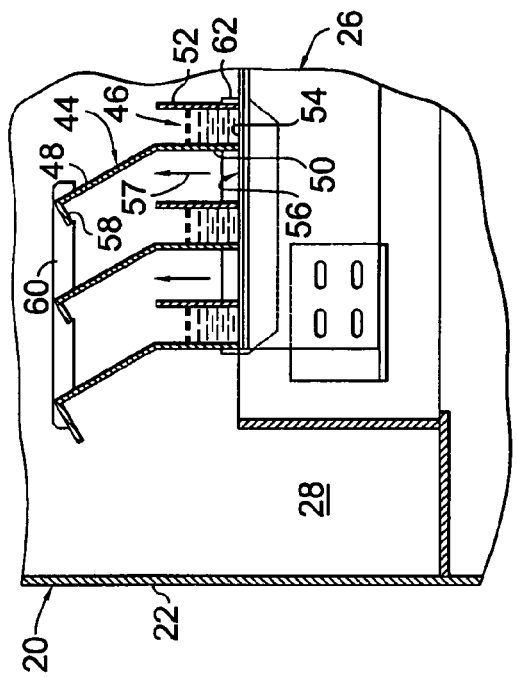
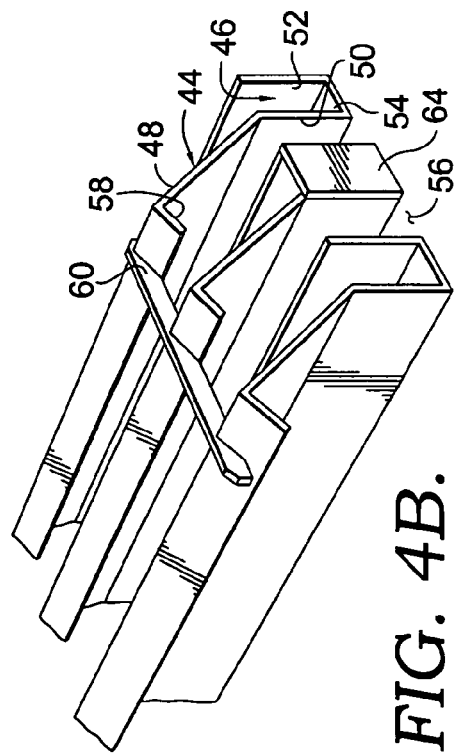
FIG. 3.
FIG. 4A.
FIG. 4B.

COMBINED LIQUID COLLECTOR AND MIXER FOR MASS TRANSFER COLUMN AND METHOD EMPLOYING SAME

CROSS-REFERENCE TO RELATED APPLICATIONS

This application claims the benefit of provisional application Ser. No. 60/460,966 filed Apr. 7, 2003.

BACKGROUND OF THE INVENTION

This invention relates generally to mass transfer columns and, more particularly, to apparatuses and methods for collecting and mixing descending liquid for more uniform distribution to an underlying bed of packing or other devices within such columns.

Mass transfer columns, including heat exchange columns, typically include an upright shell and a plurality of zones within the shell where packing and/or horizontally disposed trays are used to facilitate mass or heat transfer between fluid streams flowing within the column. The fluid streams are normally one or more downwardly flowing liquid streams and one or more ascending vapor streams, although other combinations of fluid streams are possible. Liquid exiting the bottom of one zone may have different concentrations and compositions at different locations across the horizontal cross section of the zone. In order to reduce these concentrational and compositional maldistributions, the liquid is often collected and mixed before it is then distributed to an underlying zone. Separate components are frequently used to effect the desired collection, mixing and distribution of the liquid as it descends from one zone to another. The use of separate components, however, can be undesirable because the vertical spacing occupied by these components reduces the available area within the column for other processing of the fluid streams and may require that a taller column be utilized to provide the spacing needed to effect the desired processing operations.

A combined collector and mixer has been utilized in columns of the type described above in order to reduce the number of components and the vertical spacing required to collect and mix the liquid exiting from a zone within the column. This combined collector and mixer utilizes a plurality of rows of upwardly extending vanes that collect the descending liquid and feed it into sumps that in turn feed the liquid into a center downcomer. While this device is an effective mixer because all of the collected liquid flows to a single downcomer, mixing efficiency would be greatly reduced in applications where high liquid flow rates and/or large column diameters require the use of two or more downcomers. In such applications, liquid, which is fed from one area of the collector into one downcomer, can have a different composition than liquid flowing from the remaining area of the collector into the other downcomer. As a result, a need has developed for a combined collector and mixer that is not only capable of handling high liquid flow rates using two or more downcomers but is also effective in mixing liquid from different areas of the collector so that liquid entering the downcomers is of substantially uniform composition.

SUMMARY OF THE INVENTION

In one aspect, the present invention is directed to a liquid collector that more uniformly mixes the liquid collected from an overlying zone in a mass transfer column prior to discharging the collected liquid into an underlying zone. As used herein, the term "mass transfer column" is intended to encompass those columns in which only heat exchange occurs. The liquid collector comprises at least first and second sumps, one of which may be an annular sump and the other or both of which may be chordal sumps. The sumps divide the collector into two or more liquid collection regions, each of which contains a first set of spaced apart liquid collection channels and an interspersed second set of spaced apart liquid collection channels. A plurality of upwardly extending deflectors having surfaces for directing descending liquid into the liquid collection channels are positioned in the liquid collection regions. Drain openings are positioned in the liquid collection channels to allow liquid in the first set of channels to preferentially drain into the first sump and liquid in the second set of channels to drain into the second sump. The preferential flow from the liquid collection channels can be achieved in a variety of ways, such as by partially or completely blocking the flow of liquid from one end in the first set of liquid collection channels and partially or completely blocking the flow of liquid from the opposite end in the second set of liquid collection channels, by tilting the liquid collection channels downwardly in the desired direction of flow, and by aligning the drain openings with different sumps. The first and second sets of liquid collection channels preferably deliver roughly equal amounts of liquid from each liquid collection region into the first and second sumps. In this manner, liquid in the first sump will preferably have roughly the same concentration and composition as liquid in the second sump. One or more openings, such as a downcomer inlet, are provided in at least one of the sumps to allow liquid to exit the sump for delivery to an underlying zone in the column.

In one embodiment of the collector, one of the sumps is an annular sump and the other sump is a chordal sump. In other embodiments, two or more chordal sumps are used with or without an annular sump. The liquid collection regions in some embodiments are hemispherical and can optionally include one or more center regions. In other embodiments, the liquid collector regions are pie-shaped quadrants. More than two sets of liquid collection channels can also be used.

In a preferred embodiment, two spaced apart chordal sumps and an annular sump are utilized in the collector. The chordal sumps divide the collector into three regions; two hemispheric liquid collection regions of roughly equal areas and a center liquid collection region of roughly twice the area of each hemispheric liquid collection region. Both of the chordal sumps include a downcomer inlet that drains liquid into a downcomer for delivery to an underlying liquid distributor. Flow restriction devices are positioned along the sumps in a manner to cause a portion of the liquid in each hemispheric region to bypass the adjacent sump and be delivered to the remote sump. Preferably, the collected liquid in each of the liquid collection regions is delivered in roughly equal amounts to both of the chordal sumps so that the mixed liquid within one chordal sump is of generally the same concentration and composition as the mixed liquid in the other chordal sump. In this manner, the collector is able to deliver two or more liquid streams of more uniform concentration and composition to an underlying zone even if the liquid when received by the collector from the overlying zone is of varying composition across the cross section of the column. The amount of liquid may be the same in the two or more liquid streams or greater amounts of liquid may be present in one or more of the liquid streams than in the other liquid streams. Ascending vapor flow channels are preferably formed in the spacings between adjacent liquid collection channels to allow vapor to pass upwardly through the collector in countercurrent relationship to the descending liquid.

In another aspect, the invention is directed to a method of using the described collector to collect liquid from an overlying zone in a mass transfer column and mix it to obtain one or more liquid streams of a more uniform composition. The liquid streams are then delivered to an underling zone for further processing within the column. The method comprises the steps of collecting descending liquid within a plurality of channels positioned within two or more liquid collection regions of the collector. The channels within each liquid collection region are arranged into two or more interspersed sets, with one set of channels preferentially delivering the collected liquid to one sump and another set of channels preferentially delivering the collected liquid to another sump. The first and second sets of channels preferably deliver roughly equal amounts of liquid to the two sumps. The liquid in the sumps is then delivered to an underlying zone within the column where further processing of the liquid can occur.

BRIEF DESCRIPTION OF THE SEVERAL VIEWS OF THE DRAWINGS

In the accompanying drawings which form part of the specification and are to be read in conjunction therewith and in which like reference numerals are used to indicate like parts in the various views:

FIG. 1 is a top plan view of a column taken in horizontal cross section and containing a collector constructed in accordance with the present invention, the collector being shown somewhat schematically with arrows illustrating the direction of liquid flow within the collector;

FIG. 2 is a fragmentary top plan view of the collector shown on an enlarged scale from that shown in FIG. 1;

FIG. 3 is a fragmentary side elevation view of the collector taken in vertical section along line 3—3 of FIG. 2;

FIG. 4A is a fragmentary side elevation view of the collector within the area designated by the number 4A in FIG. 3 and shown on a still further enlarged scale;

FIG. 4B is a perspective view of a group of vanes of the collector in accordance with an embodiment of the present invention;

DETAILED DESCRIPTION OF THE PREFERRED EMBODIMENTS

Figure 6:
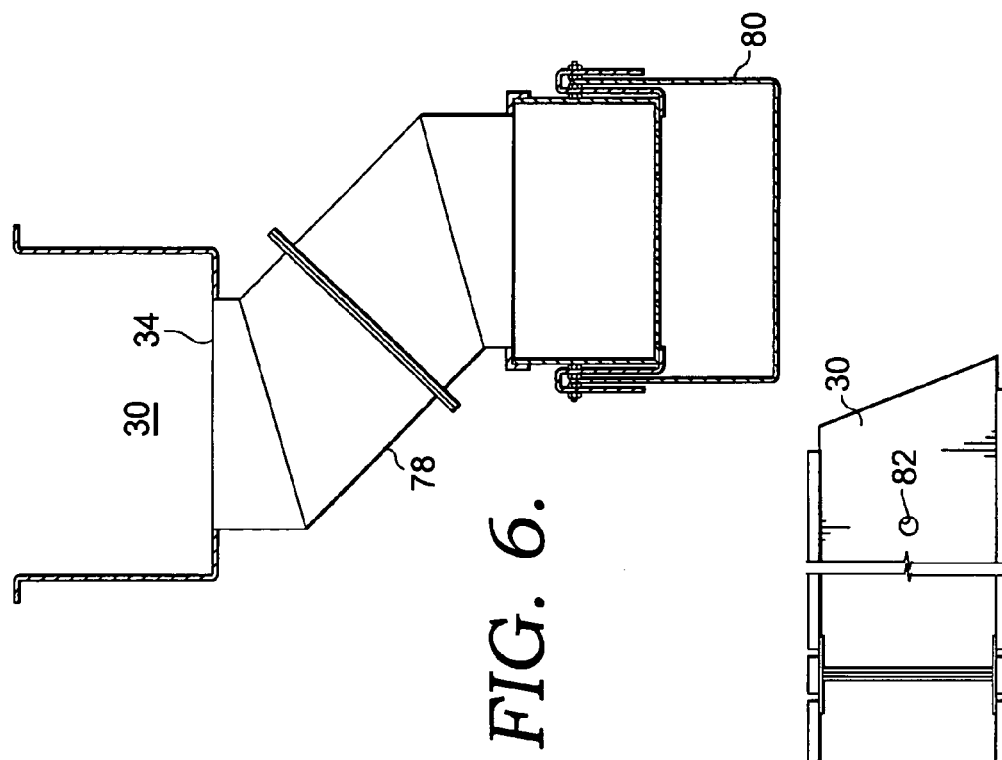
FIG. 6 is an enlarged fragmentary end elevation view of the collector taken along line 6—6 of FIG. 2 and showing a downcomer extending between the chordal sump and a parting box of an underlying distributor.

Turning now to the drawings in greater detail and initially to FIG. 1, a column of the type in which fluid streams are processed to obtain fractionation products and/or otherwise to cause mass transfer and heat exchange between the fluid streams is designated broadly by the numeral 20. Column 20 comprises a rigid upright shell 22 having a cylindrical, polygonal or other suitable configuration and constructed from metal or other materials compatible with the fluids and conditions within the column. Shell 22 has a diameter and height selected for permitting the desired processing of fluid streams in an open internal area 24 defined by the shell 22.

A collector 26 of the present invention is mounted within the shell 22 in a substantially horizontal orientation and is sized to fill substantially the entire horizontal cross section of the open internal area 24 so that the collector 26 captures substantially all of the liquid descending from an overlying zone. The overlying zone contains any of various devices commonly found within mass transfer or heat exchange columns that cause lateral distribution of the liquid. For example, the overlying zone can contain a bed of random or structured packing. The specific nature of the devices within the overlying zone is unimportant to an understanding of the present invention.

As best shown in FIG. 1, the collector 26 comprises an annular sump 28 and two chordal sumps 30 and 32 that extend in parallel and spaced apart relationship. The chordal sumps 30 and 32 are of a length to extend completely across the cross section of the column 20 with their ends interconnected with the annular sump 28. Downcomer inlets 34 and 36 are centrally positioned along the horizontal length of the chordal sumps 30 and 32, respectively. As will be discussed below, the present invention can be utilized with different arrangements and numbers of sumps, as well as different numbers and locations of downcomer inlets.

The chordal sumps 30 and 32 are positioned to divide the surface of the collector 26 into a center and two side regions, 38, 40 and 42 respectively, with the area of the center region 38 being roughly twice the area of each of the two side regions 40 and 42. Turning additionally to FIGS. 2–4B, a plurality of parallel rows of upright liquid collecting vanes 44 are positioned within and substantially fill these regions 38, 40 and 42. As best illustrated in FIG. 4A and FIG. 4B, the vanes 44 each comprise a channel 46 and a deflector 48 that extends upwardly from the channel 46 at an angle to the vertical. The channel 46 and deflector 48 of the vane 44 are illustrated as an integral, one-piece construction, but they may instead be formed as separate components. Preferably, the various parts of each vane 44 are formed by simply bending a single piece of metal or other material into the desired configuration, although other forms of construction can be used if desired. The channel 46 is formed from longitudinally extending side walls 50 and 52 that are spaced apart and interconnected by a bottom panel 54. The channel 46 has a width that is less than the spacing between adjacent vanes 44 so that an open vapor passage 56 is formed between the vanes 44 to permit upward passage of vapor designated by arrows 57 through the collector 26.

The deflector 48 extends upwardly at an angle from side wall 50 and has a downwardly angled flange 58 at its upper end. The angled nature of the deflector 48 and the flange 58 positioned at its upper end forms a shield over the adjacent vapor passage 56 to block descending liquid from entering the vapor passage 56. The descending liquid is instead funneled into the channel 46 by the angled surface of the associated deflector 48 and by the flange 58 carried by the adjacent vane 44. The spacing between adjacent vanes 44 is maintained by spacer plates 60 that extend transversely across the upper ends of groups of adjacent vanes 44 and have cutouts for receiving the upper ends of the deflectors 48. In a similar manner, a plurality of laterally spaced apart bolting plates 62 extend transversely under the lower ends of groups of vanes 44 and have cutouts for receiving the channels 46.

Figure 5:
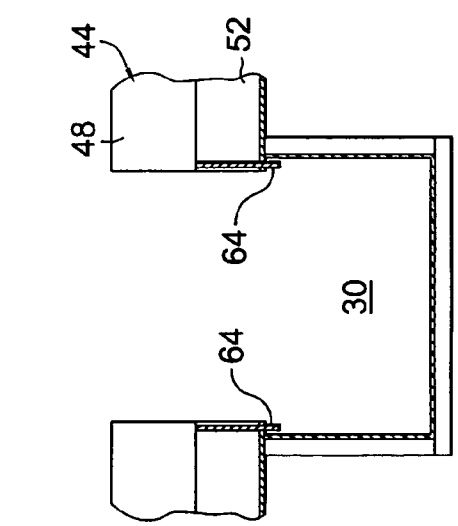
FIG. 5 is an enlarged fragmentary end elevation view of the collector taken in vertical section along line 5—5 of FIG. 2 and showing further details of a chordal sump.

The vanes 44 are longitudinally oriented so that they extend horizontally between the chordal sumps 30 and 32 in the center region 38 and between the chordal sumps 30 and 32 and the annular sump 28 in the side regions 38 and 40, respectively. The vanes 44 preferably extend perpendicularly to the horizontal longitudinal axis of the chordal sumps 30 and 32, but can alternatively extend at other angles. At least one end of the channel 46 in each vane 44 is open to act as a drain opening to permit fluid to flow from the channel 46 into the adjacent annular sump 28 or chordal sump 30 or 32. The other end in at least some or all of the channels 46 is completely or partially blocked by a flow restrictor in the form of a plate 64 (FIGS. 4B and 5) to prevent or impede liquid from exiting the channel 46 through the blocked end. In this manner, some of the channels 46 within center region 38 preferentially feed liquid into chordal sump 30 while others of channels 46 preferentially feed liquid into the other chordal sump 32. Still others of the channels 46 within the center region 38 can be open on both ends to feed liquid into both chordal sumps 30 and 32. For example, in one arrangement, every other channel 46 is blocked at one end and the remaining channels 46 are blocked at the opposite end by plates 64 so that adjacent channels 46 preferentially feed liquid into different chordal sumps 30 and 32. In another arrangement, every third channel 46 is open at both ends to feed both sumps 30 and 32 while the remaining channels 46 are blocked at alternating ends. It will be appreciated that other arrangements can be used so long as the flow of liquid from the center region 38 is divided into roughly equal portions that are fed into the two chordal sumps 30 and 32. It is also important that adjacent channels 46 or groupings of channels feed different chordal sumps 30 and 32 so that liquid in one sump is of substantially the same composition as the liquid in the other sump. In this manner, liquid captured by the vanes 44 across the cross section of the center region 38 is well mixed and is of uniform composition prior to entering the separate downcomer inlets 34 and 36.

In a similar manner, the channels 46 in the vanes 44 in the side regions 40 and 42 are open at one or both ends in an alternating or other manner to feed liquid into the annular sump 28 and adjacent chordal sump 30 or 32. In this manner, the liquid captured by the vanes 44 in both of the side regions 40 and 42 is fed in roughly equally amounts to the annular sump 28 and the chordal sumps 30 and 32.

Figure 9:
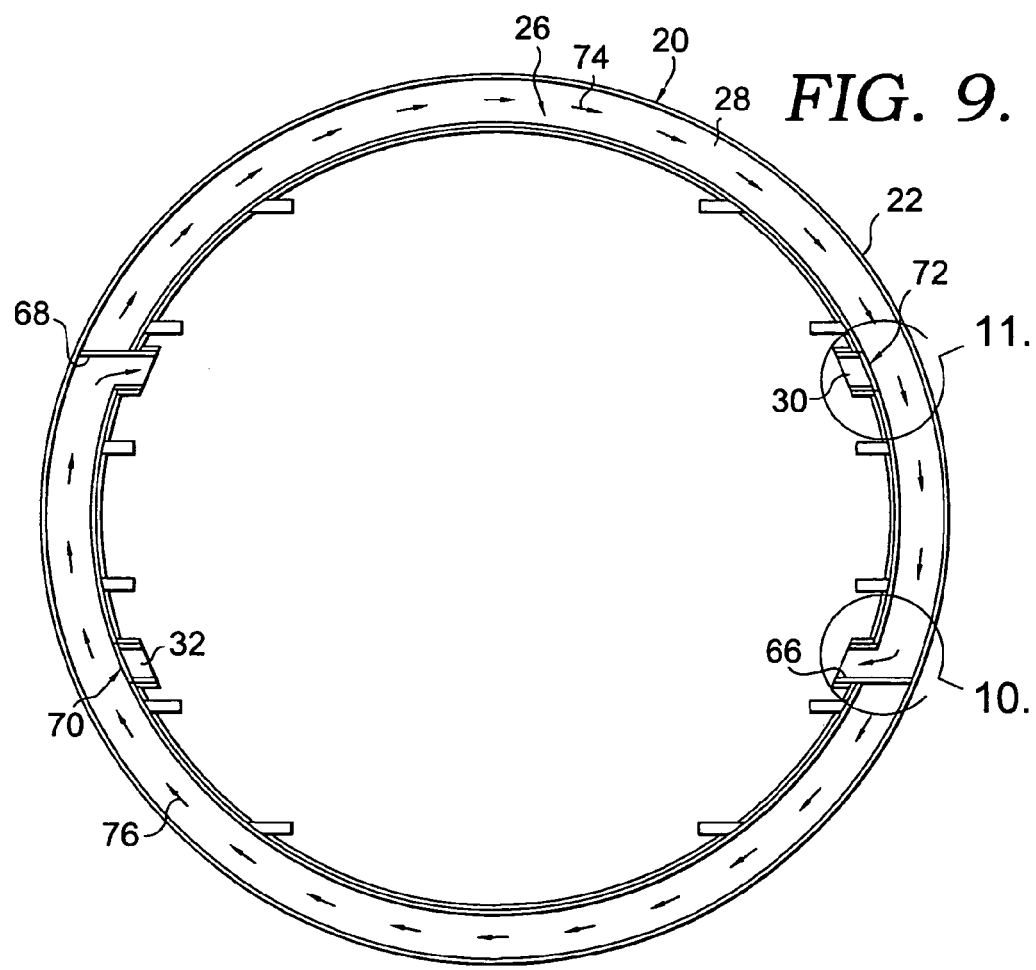
FIG. 9 is a top plan view of the collector with center portions removed to illustrate the flow of liquid along the annular or ring sump.
Figure 10:
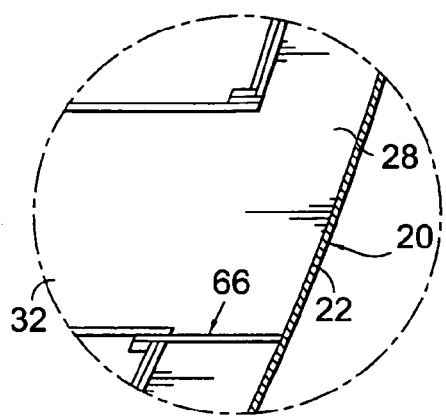
FIG. 10 is a fragmentary top plan view of the collector taken within the area designated by the number 10 in FIG. 9 and showing further details of the area where the annular sump feeds into an end of one of the chordal sumps.
Figure 11:
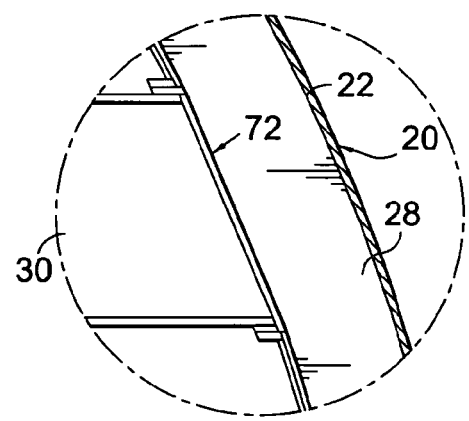
FIG. 11 is a fragmentary top plan view of the collector taken within the area designated by the number 11 in FIG. 9 and showing further details of the area where the annular sump is blocked from feeding into the corresponding end of the other chordal sump.

The annular sump 28 feeds its liquid into selected ends of the chordal sumps 30 and 32 that in turn feed the collected liquid into the downcomer inlets 34 and 36. As can best be seen in FIGS. 9–11, a hemispheric portion of the annular sump 28 feeds liquid into one end of chordal sump 30 and the other hemispheric portion feeds liquid into the opposite end of the other chordal sump 32. An annulus blocking plate 66 is positioned in the annular sump 28 just downstream from the inlet end of the chordal sump 30 and another annulus blocking plate 68 is positioned just downstream from the inlet end of the other chordal sump 32. The opposite ends of the chordal sumps 30 and 32 are blocked by end plates 70 and 72 respectively to prevent or impede liquid from entering the blocked ends of the sumps 30 and 32 from the annular sump 28 and to prevent or impede liquid in the chordal sumps 30 and 32 from entering the annular sump 28. As can be seen in FIG. 1, the annulus blocking plates 66 and 68 and sump end plates 70 and 72 thus serve to divide the annular sump 28 into the hemispheric portions that feed liquid from side region 40 into chordal sump 32 and also feed liquid from the other side region 42 into the other chordal sump 30. In this manner, some of the liquid captured by the vanes 44 in side region 40 is mixed with the liquid in the other side region 42 prior to entry into the downcomer inlets 34 and 36. In a preferred arrangement, one portion of the liquid captured in side region 40 is delivered through one end of the associated channels 46 directly into the chordal sump 30 while the other, preferably equal, portion of the captured liquid is directed through the other end of the channels 46 into one hemispheric portion of the annular sump 28 where it is carried in the direction of flow arrows 74 to the other chordal sump 32. In the same manner, one portion of the liquid captured in the other side region 42 is delivered directly to chordal sump 32 while the other portion is directed to the other hemispheric portion of the annular sump 28 and is carried in the direction of flow arrows 76 to the other chordal sump 30. This arrangement ensures that equal parts of the liquid captured by the collector 26 are fed to the downcomer inlets 34 and 36 and that the liquid entering one inlet is of substantially the same composition as liquid entering the other inlet. In order to facilitate the desired directional flow of the liquid along the sumps 28, 30 and 32, the floors of the sumps can optionally be inclined downwardly in the direction of flow. Similarly, rather than using end plates 64 to impede liquid flow from ends of the channels 46, the channels can simply be tilted downwardly in the direction of the desired flow of liquid from the channels 46.

Figure 7:
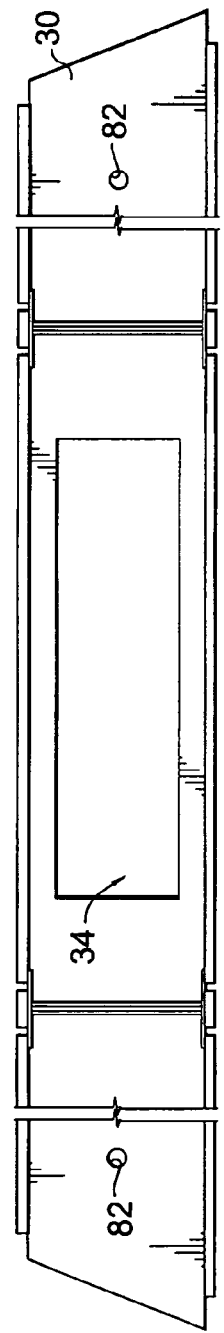
FIG. 7 is a fragmentary top plan view of the collector showing the chordal sump and downcomer on an enlarged scale from that shown in FIG. 2.
Figure 8:
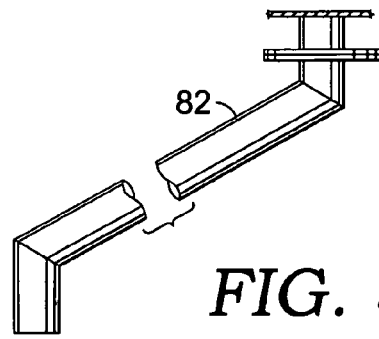
FIG. 8 is a side elevation view of a downpipe used with the collector.

Turning now to FIGS. 6–8, a downcomer 78 extends downwardly from each downcomer inlet 34 and 36 and is received within a parting box 80 of an underlying distributor. The downcomer 78 preferably extends vertically downward, but may also be inclined as illustrated in FIG. 6. Downpipes 82 are also provided in both chordal sumps adjacent the ends of the rectangular downcomer inlets 34 and 36. The underlying distributor is used to effect a uniform lateral distribution of the liquid to an underlying zone containing devices such as beds of packing. The specific details of the distributor and devices in the underlying zone are not important to the present invention that resides in the design of the collector 26. The use of two downcomers 78 allows the collector 26 to handle high liquid flow rates while the design of the collector 26 ensures that the flow rate and composition of liquid in one downcomer is roughly the same as that in the other downcomer.

Figure 12:
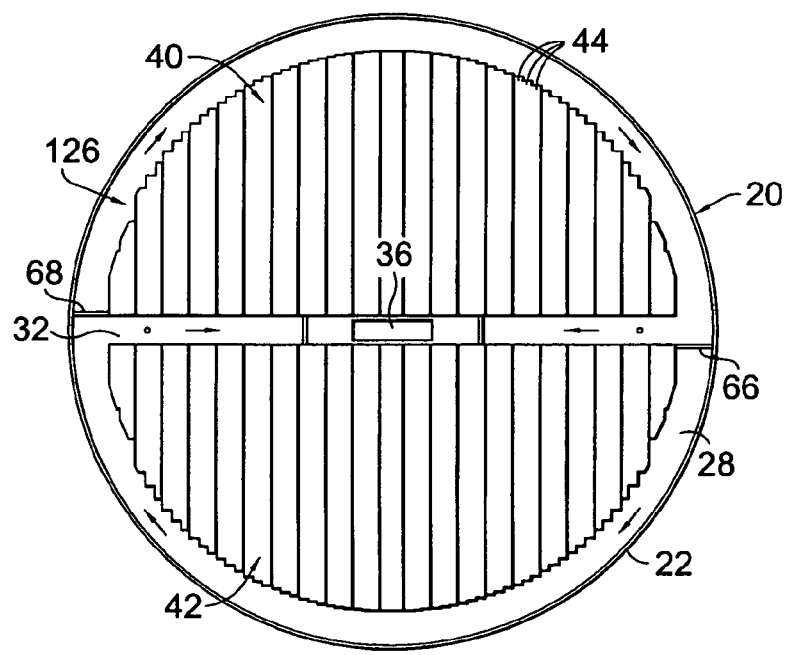
FIGS. 12–18 are top plan views of a column containing collectors constructed in accordance with different embodiments of the present invention and shown somewhat schematically to illustrate the direction of liquid flow within the collector.

Referring next to FIG. 12, another embodiment of a collector 126 comprising an annular sump 28 and a single chordal sump 32 is shown. The chordal sump 32 extends completely across the center cross section of the column 20 with its ends interconnected with the annular sump 28.

Downcomer inlet 36 is centrally positioned along the horizontal length of the chordal sump 32.

The chordal sump is positioned to divide the surface of the collector 126 into two side regions 40 and 42, of roughly equal area. A plurality of parallel rows of upright liquid collecting vanes 44 of the type previously described are positioned within and substantially fill regions 40 and 42.

At least one end of the channel 46 of each vane 44 is open to form a drain opening that permits fluid to flow from the channel 46 into the adjacent annular sump 28 or chordal sump 32. In this embodiment, every other channel is blocked at one end and the remaining channels 46 are blocked at the opposite ends by plates, such as plates 64 previously described, so that adjacent channels 46 preferentially feed liquid into the chordal sump 32 or annular sump 28. Annulus blocking plates 66 and 68 are positioned in the annular sump 28 at opposite ends of the chordal sump 32 to divide the annular sump 28 into hemispheric portions that separately feed liquid into opposite ends of the chordal sump 32. Liquid that enters the annular sump 28 from liquid collection region 40 is thus delivered to one end of the chordal sump 32 while liquid entering the annular sump 28 from the other liquid collection region 42 is delivered to the opposite end of the chordal sump 32. In this manner, some of the liquid captured by the vanes 44 across the cross section of the side regions 40 and 42 is mixed in different hemispheric portions of the annular sump 28 before reaching the chordal sump 32 and is of a more uniform composition prior to entering the downcomer inlet 36. The annulus blocking plates 66 and 68 can also be omitted if so desired. The design variations previously described with respect to collector 26 can be used with collector 126. For example, instead of flow liquid out of the opposite ends of adjacent channels 46, the channels 46 may be grouped together such that two or more adjacent channels 46 discharge liquid at the same end. Similarly, the desired directional flow from channels 46 can be achieved by sloping the channels 46 downwardly in the desired direction of flow.

Figure 13:
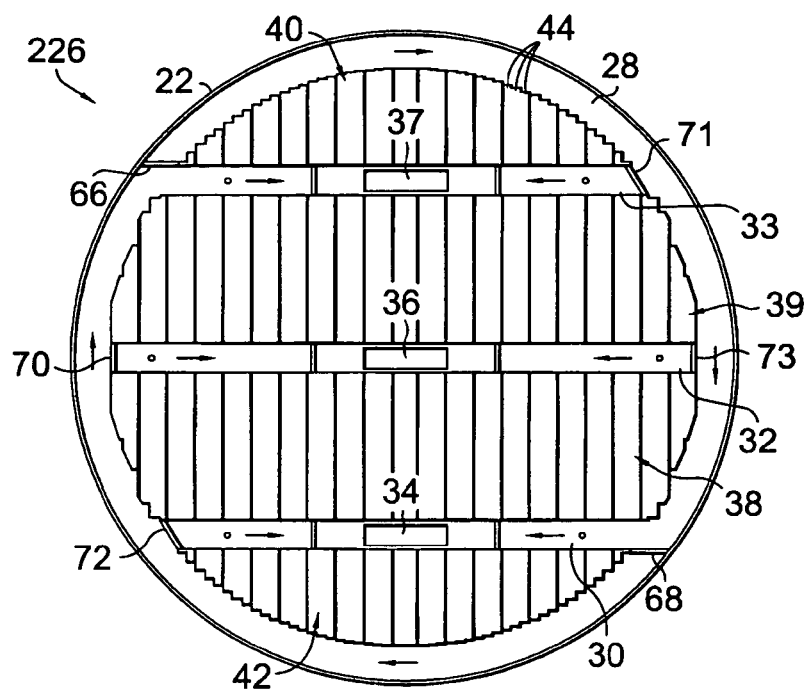

Referring next to FIG. 13, another embodiment of a collector of present invention is shown and is designated by the numeral 226. The collector 226 includes an annular sump 28 and three chordal sumps 30, 32 and 33 that extend in a parallel and spaced apart relationship. Downcomer inlets 34, 36, and 37 are centrally positioned along the horizontal length of the chordal sumps 30, 32, and 33, respectively.

The chordal sumps 30, 32, and 33 are positioned to divide the surface of the collector into two center regions 38 and 39, and two side regions 40 and 42. A plurality of parallel rows of upright liquid collecting vanes 44 are positioned within and substantially fill regions 38, 39, 40, and 42. The vanes 44 are longitudinally orientated so that they extend between the chordal sumps 30 and 32 in the center region 38 and between the chordal sumps 32 and 33 in the center region 39. The vanes 44 are also longitudinally orientated so that they extend between chordal sump 33 and annular sump 28 in side region 40 and between chordal sump 30 and annular sump 28 in side region 42. At least one end of the channel 46 in each vane 44 is open to permit fluid to flow from the channel 46 into the adjacent annular sump 28 or chordal sump 30, 32, or 33. The other end of at least some of the channels 46 is completely or partially blocked, such as by plate 64 previously described, to prevent or impede liquid from exiting the channel 46 through the blocked end. In this manner, liquid preferentially flows in one direction from some channels 46 and preferentially flows in the opposite direction from others of the channels 46.

The annulus blocking plates 66 and 68 and sump end plates 70, 71, 72 and 73 serve to divide the annular sump 28 into hemispheric portions. One hemispheric portion of the annular sump 28 feeds liquid into one end of the chordal sump 33 and the other hemispheric portion feeds liquid into the opposite end of the other chordal sump 30. An annulus blocking plate 66 is positioned in the annular sump 28 just downstream from the inlet end of the chordal sump 33, and another annulus blocking plate 68 is positioned just downstream from the inlet end of the chordal sump 30. The opposite ends of the chordal sumps 30 and 33 are blocked by end plates 71 and 72 respectfully, to prevent or impede liquid from entering the blocked ends of sumps 30 and 33 from annular sump 28 or prevent or impede liquid in chordal sumps 30 and 33 from entering annular sump 28. Both ends of chordal sump 32 are blocked by end plates 70 and 73 to prevent or impede liquid from entering the blocked ends of sump 32 from the annular sump 28 and to prevent or impede liquid in sump 32 from entering annular sump 28. However, in another embodiment, the ends of chordal sump 32 are not blocked by end plates or they are perforated, or are of a reduced height to act as weirs, or are otherwise constructed to allow portions of the liquid in annular sump 28 to be fed into the center chordal sump 32 and liquid in the chordal sump 32 to flow into annular sump 28.

Channels 46 in the vanes 44 in side region 42 are open at one or both ends in an alternating or other manner to feed liquid into the annular sump and adjacent chordal sump 30. In this manner, one portion of the liquid captured by the vanes 44 in side region 42 is delivered directly to chordal sump 30 while the other portion is directed into the annular sump and is carried to chordal sump 33.

Similarly, channels 46 in the vanes 44 in side region 40 are open at one or both ends in an alternating or other manner to feed liquid into the annular sump and adjacent chordal sump 33. In this manner, one portion of the liquid captured by the vanes 44 in side region 40 is delivered directly to chordal sump 33 while the other portion is directed into the annular sump 28 and is carried to chordal sump 30.

The channels 46 in the vanes 44 in center regions 38 and 39 are open at one or both ends in an alternating or other manner to feed liquid into center chordal sump 32 and adjacent sumps 30 and 33 respectively. This arrangement ensures that liquid captured by the collector 226 is fed to the downcomer inlets 34, 36 and 37 in proportional amounts and that the liquid entering one downcomer inlet is of substantially the same composition as the liquid entering the other downcomer inlets. Design variations and features previously described with respect to the other collector embodiments can also be used with collector 226.

Figure 17:
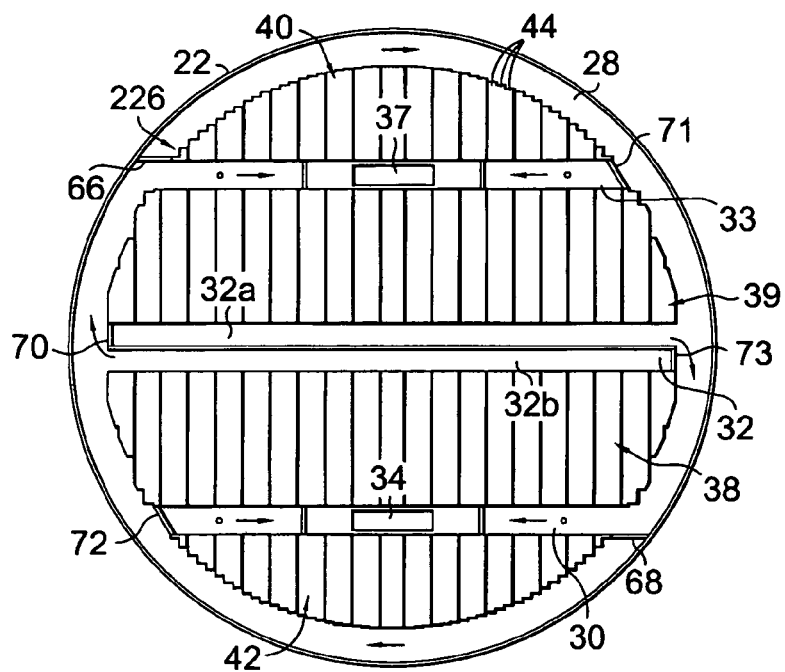

In a variation of collector 226 illustrated in FIG. 17, the single center chordal sump 32 is replaced with two adjacent chordal sumps 32a and 32b and the associated downcomer 36 is eliminated. One end of chordal sump 32a is in fluid flow communication with one portion of the annular sump 28 so that liquid entering chordal sump 32a from liquid collection region 39 preferentially flows into the annular sump 28 and then into chordal sump 30. Similarly, the opposite end of chordal sump 32b is in fluid flow communication with another portion of the anular sump 28 so that liquid entering chordal sump 32b from liquid collection region 38 preferentially flows into the annular sump 28 and then into chordal sump 33. Flow restrictor plates 70 and 73 are positioned in the other ends of chordal sumps 32a and 32b, respectively, to block or impede flow of liquid out of or into those ends of the chordal sumps 32a and 32b.

Figure 14:
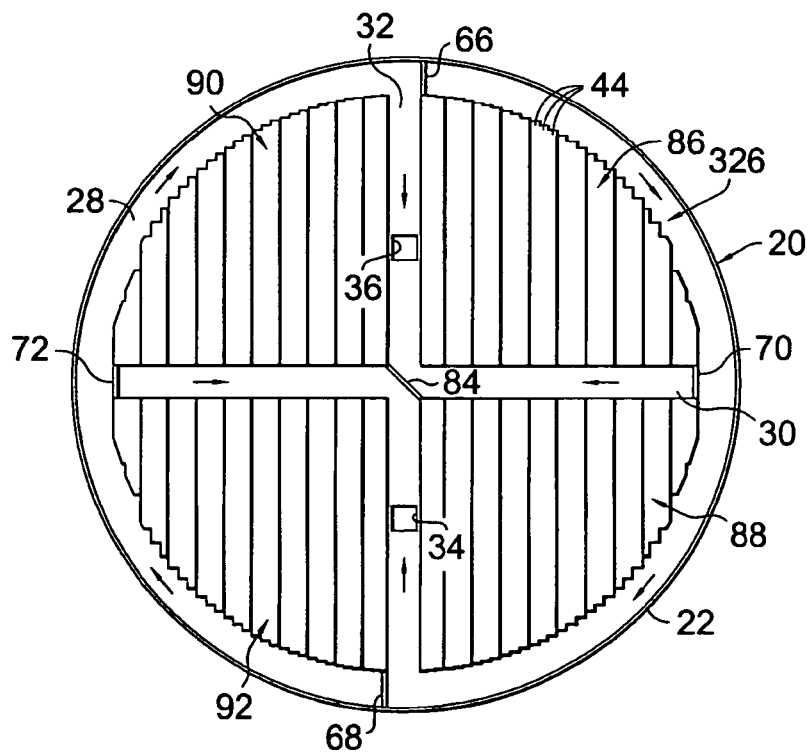

Referring next to FIG. 14, a still further embodiment of a collector is illustrated and is designated by the numeral 326. Collector 326 includes an annular sump 28 and two chordal sumps 30 and 32 that intersect to divide the surface of the collector 26 into four pie-shaped quadrant regions 86, 88, 90 and 92, of roughly equal area. Downcomer inlets 34, 36, and are positioned along the horizontal length of one of the chordal sumps 30 or 32. A plurality of parallel rows of upright liquid collecting vanes are positioned within and substantial fill regions 86, 88, 90 and 92. The vanes 44 are longitudinally oriented so that they extend between one of the chordal sumps 30 or 32 and the annular sump 28. At least one end of the channel 46 of each vane 44 is open to permit fluid to flow from the channel 46 into the adjacent annular sump 28 or chordal sump 30 or 32.

An annulus blocking plate 66 is positioned in the annular sump 28 just downstream from the first end of chordal sump 32 and another annulus blocking plate 68 is positioned just downstream from the second end of chordal sump 32. The first and second ends of chordal sump 30 are blocked by end plates 70 and 72 respectively to prevent or impede liquid from entering the blocked ends of sump 30 from the annular sump 28 or to prevent or impede liquid in sump 30 from entering annular sump 28. A central plate 84 is placed diagonally between (quadrants regions) 90 and 88 such that liquid flowing along one half chordal sump 30 is redirected into one portion of chordal sump 32 to reach the downcomer inlet 36 and liquid flowing in the opposite direction along the other half of the chordal sump 30 is redirected into the other portion of chordal sump 32 to reach the other downcomer inlet 34. It can be seen that the central plate 84 in effect divides both chordal sumps 30 and 32 into two smaller sumps and the downcomer inlets 34 and 36 are positioned only in the two smaller sumps created from sump 32.

Channels 46 in the vanes 44 in quadrant regions 86 and 88 are open at one or both ends in an alternating or other manner to feed liquid into the annular sump 28 and adjacent chordal sump 30. In this manner, one portion of the liquid captured by the vanes 44 in regions 86 and 88 is delivered directly to chordal sump 30 and eventually into downcomer 36 in chordal sump 32 while the other portion is directed into the annular sump 28 and is carried to the first end of chordal sump 32 and downcomer 34.

In quadrant regions 90 and 92, channels 46 in the vanes 44 are open at one or both ends in an alternating or other manner to feed liquid into the annular sump 28 and adjacent chordal sump 30. In this manner, one portion of the liquid captured by the vanes 44 in regions 90 and 92 is delivered directly to chordal sump 30 and eventually into downcomer inlet 34 in chordal sump 32 while the other portion is directed into the annular sump and is carried to the second end of chordal sump 32 and downcomer inlet 36. This arrangement ensures that substantially equal parts of the liquid captured by the collector 326 are fed to the downcomer inlets 34 and 36 and that the liquid entering one inlet is of substantially the same composition as the liquid entering the other inlet. Liquid entering downcomer inlet 36 flows downwardly and is discharged into one parting box, such as parting box 80 previously described, liquid entering downcomer inlet 34 flows into another parting box.

Figure 15:
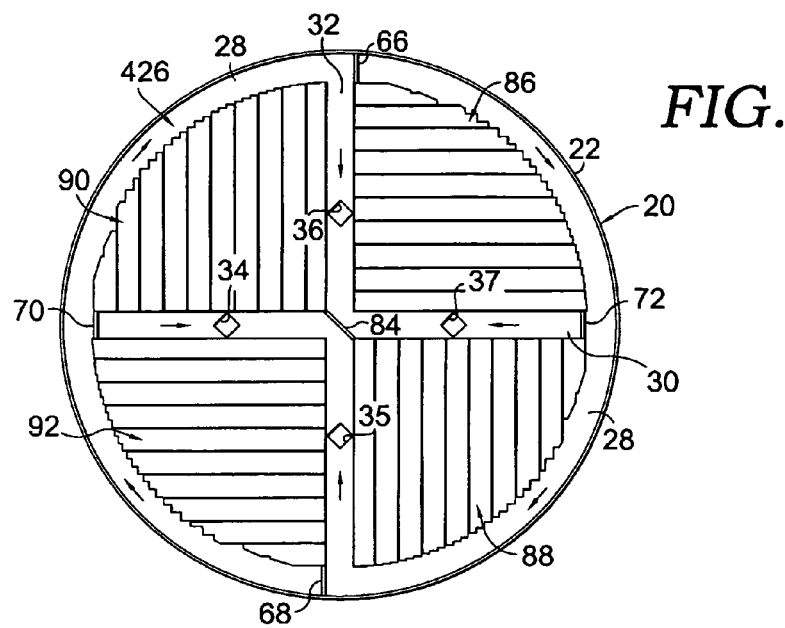

Referring next to FIG. 15, another collector embodiment is shown and is designated by the numeral 426. A collector 426 includes an annular sump 28 and two chordal sumps 30 and 32 that intersect to divide the surface of the collector 26 into four pie-shaped quadrant regions 86, 88, 90 and 92, of roughly equal area. Downcomer inlets 34, 35, 36, and 37 are positioned along the horizontal length of the chordal sumps 30 and 32. A plurality of parallel rows of upright liquid collecting vanes are positioned within and substantially fill regions 86, 88, 90 and 92. The vanes 44 in regions 88 and 90 are longitudinally oriented so that they extend between chordal sump 30 and the annular sump 28. The vanes 44 in regions 86 and 92 are rotated from the position illustrated in FIG. 14 and are oriented so that they extend between chordal sump 32 and annular sump 28. At least one end of the channel 46 of each vane 44 is open to permit fluid to flow from the channel 46 into the adjacent annular sump 28 or chordal sump 30 or 32.

An annulus blocking plate 66 is positioned in the annular sump 28 just downstream from the first end of chordal sump 32 and another annulus blocking plate 68 is positioned just downstream from the second end of chordal sump 32. The first and second ends of chordal sump 30 are blocked by end plates 70 and 72 respectively to prevent or impede liquid from entering the blocked ends of sump 30 from the annular sump 28 or to prevent or impede liquid in sump 30 from entering annular sump 28. A center plate 84 is placed diagonally between quadrant regions 88 and 90 such that liquid flowing along a portion of chordal sump 30 is redirected into chordal sump 32 to reach the downcomer inlets 35 and 36.

Channels 46 in the vanes 44 in quadrant region 86 are open at one or both ends in an alternating or other manner to feed liquid into the annular sump 28 and adjacent chordal sump 32. In this manner, one portion of the liquid captured by the vanes 44 in region 86 is delivered directly to chordal sump 32 and eventually into downcomer inlets 36 while the other portion is directed into the annular sump and is carried to the first end of chordal sump 32 and downcomer 35.

Channels 46 in the vanes 44 in quadrant region 88 are open at one or both ends in an alternating or other manner to feed liquid into the annular sump 28 and adjacent chordal sump 30. In this manner, one portion of the liquid captured by the vanes 44 in region 88 is delivered directly to chordal sump 30 and into downcomer inlet 37 while the other portion is directed into the annular sump 28 and is carried to the first end of chordal sump 32 and downcomer 35.

Channels 46 in the vanes 44 in quadrant region 90 are open at one or both ends in an alternating or other manner to feed liquid into the annular sump 28 and adjacent chordal sump 30. In this manner, one portion of the liquid captured by the vanes 44 in region 90 is delivered directly to chordal sump 30 and into downcomer inlet 34 while the other portion is directed into the annular sump 28 and is carried to the second end of chordal sump 32 and downcomer 36.

Channels 46 in the vanes 44 in quadrant region 92 are open at one or both ends in an alternating or other manner to feed liquid into the annular sump 28 and adjacent chordal sump 32. In this manner, one portion of the liquid captured by the vanes 44 in region 92 is delivered directly to chordal sump 32 and into downcomer inlet 35 while the other portion is directed into the annular sump 28 and is carried to the second end of chordal sump 32 and downcomer 36.

The arrangement described above ensures that substantially equal parts of the liquid captured by the collector 426 are fed to the downcomer inlets 34 and 35 as are fed to the downcomer inlets 36 and 37 and that the liquid entering each inlet is of a more uniform, although not completely uniform, composition. Liquid entering downcomer inlets 34 and 35 flows downwardly and, to achieve more complete and uniform mixing, is preferably delivered into one parting box of the type previously described. Likewise, the liquid entering downcomer inlets 36 and 37 flows downwardly into a different parting box 80.

Figure 16:
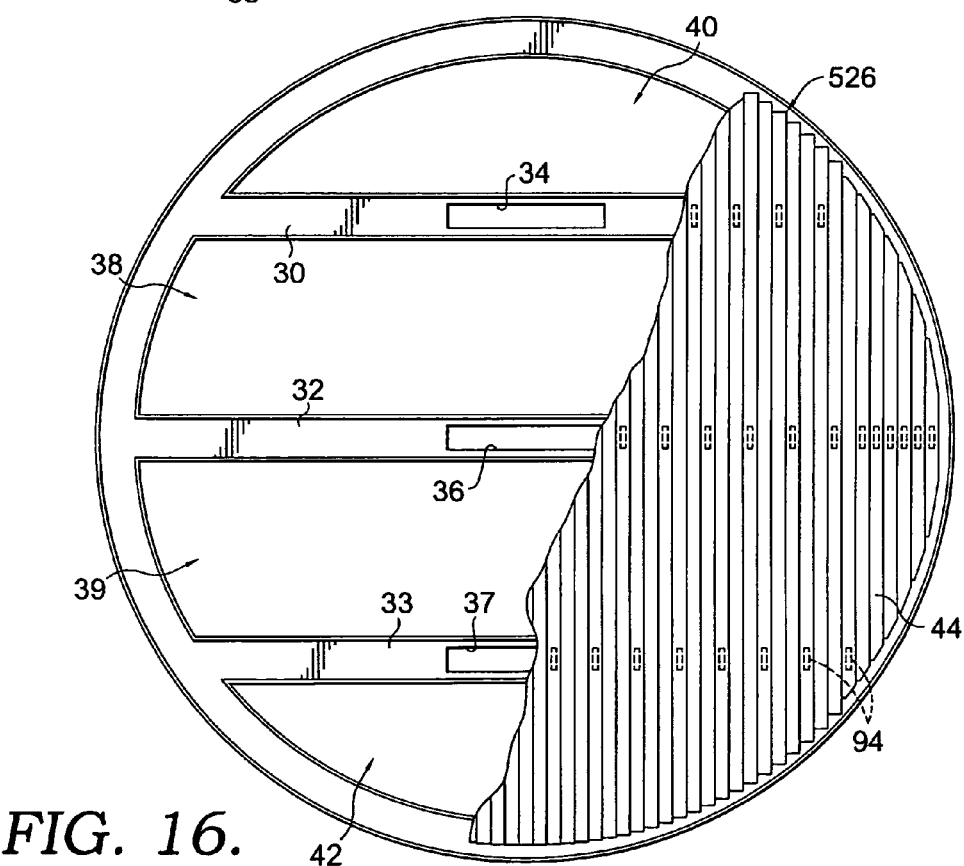

Referring next to FIG. 16, a collector 526 is illustrated and differs from the embodiments previously described in the manner in which liquid exits the channels 46. Collector 526 includes chordal sumps 30, 32 and 33 that extend in a parallel and spaced apart relationship. Downcomer inlets 34, 36, and 37 are centrally positioned along the horizontal length of the chordal sumps 30, 32, and 33 respectively. The chordal sumps 30, 32, and 33 are positioned to divide the surface of the collector into two center regions 38 and 39, and two side regions 40 and 42. A plurality of parallel rows of upright liquid collecting vanes 44 are positioned within and substantially fill these regions 38, 39, 40, and 42. The vanes 44 are longitudinally orientated so that they extend across all or most of the column 20.

In a preferred embodiment, the floor and/or side walls of the channels 46 in the vanes 44 have at least one drain opening 94 to feed liquid into one or more of the sumps 30, 32, and 33. The channels 46 of adjacent vanes 44 have drain openings 94 positioned in an alternating or other manner to feed liquid into sumps 30, 32 and 33. In this manner, one portion of the liquid captured by the vanes 44 in regions 38, 39, 40 and 42 is delivered directly to chordal sump 30 and into downcomer inlet 34 while the other portions of the liquid captured in region 40 is delivered directly to chordal sumps 32 and 33 and into downcomer inlets 36 and 37 respectively.

The number and arrangement of sumps and downcomer inlets can be varied in collector 526. As but one example, the collector 526 can include an annular sump of the type previously described, in addition to chordal sumps 30, 32 and 33. When an annular sump is utilized, at least one end of the channel 46 of each vane 44 is open to permit fluid to flow from the channel 46 into the adjacent annular sump or each channel has at least one drain opening 94 to feed liquid into one or more of the sumps 30, 32, and 33. In this embodiment, end plates may be used to prevent or impede liquid from flowing from the annular sump 28 into the chordal sumps 30, 32 and 33. The end plates may be perforated, of differing heights, or otherwise constructed to control the amount of liquid fed from the annular sump into the chordal sumps 30, 32 and 33. The end plates may be of a height to prevent any liquid from flowing from the annular sump into one or more of the chordal sumps 30, 32 and 33 or vice-versa or may be perforated, of differing heights, or otherwise constructed to allow a controlled amount of liquid to enter and exit one or more of the chordal sumps 30, 32 and 33.

Figure 18:
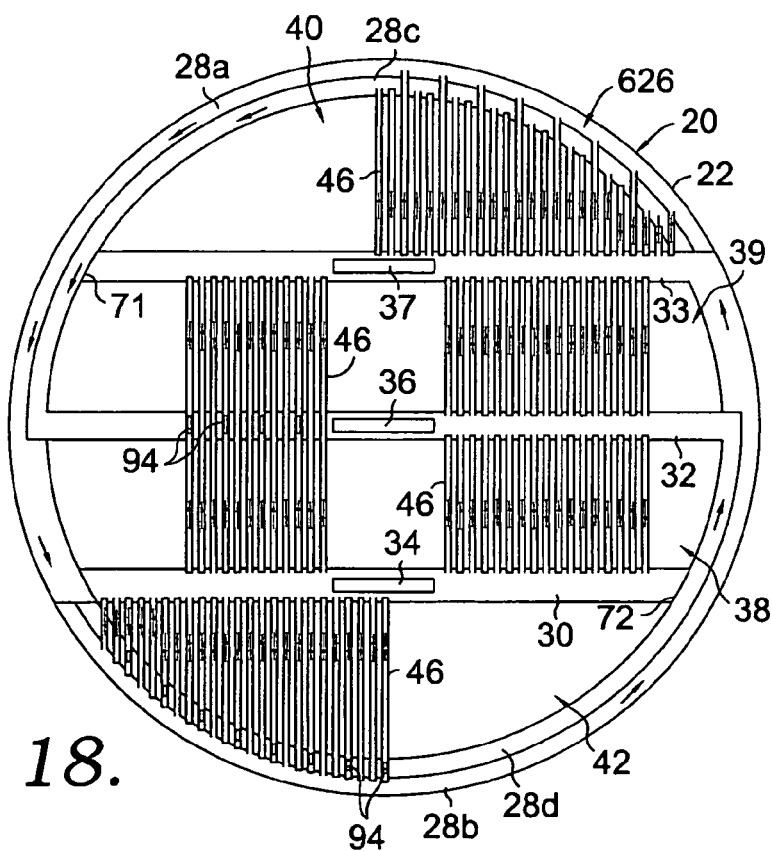

In still further embodiments, the single annular sump 28 is replaced by two or more concentric annular sumps to deliver liquid from different liquid collection areas into different chordal sumps. A collector 626 employing such concentric annular sumps is illustrated in FIG. 18. In collector 626, an annular region is partitioned into a first outer annular sump 28a that extends around a portion of the circumference of the annular region and a second outer annular sump 28b that extends around the remaining portion of the circumference. A concentric first inner annular sump 28c is positioned radially inwardly from and preferably adjacent to the first outer annular sump 28a and extends around a smaller portion of the annular region circumference. A similar second inner annular sump 28d is positioned radially inwardly from the second outer annular sump 28b and extends around another smaller portion of the annular region circumference. The first outer and inner annular sumps 28a and 28c feed liquid into one end of chordal sump 30 and center chordal sump 32, respectively, with the opposite end of chordal sump 30 being closed by a flow restrictor plates 72. In a similar manner, the second outer and inner annular sumps 28b and 28d feed liquid into the opposite end of the chordal sump 33 and center chordal sump 32, respectively. The other ends of the chordal sumps 33 and 30 are closed by flow restrictor end plates 71 and 72, respectively, to block or impede liquid flow between those ends of the chordal sumps 33 and 30 and the inner annular sumps 28c and 28d, respectively. Liquid collection channels 46 in each of liquid collection regions 38, 39, 40 and 42 drain the collected liquid into two or more of the sumps 28a–d, 30, 32 and 33. For example, the liquid collection channels 46 in liquid collection region 40 divide the collected liquid proportionally among the outer annular sump 28a, inner annular sump 28c, and center chordal sump 32. The outer annular sump 28a in turn delivers the liquid to chordal sump 30 and the inner annular sump 28c delivers the liquid to center chordal sump 32. In a similar manner, the liquid collection channels 46 in liquid collection region 42 divide the collected liquid proportionally among the outer annular sump 28b, inner annular sump 28d, and chordal sump 30. The outer annular sump 28b in turn delivers the liquid to chordal sump 33 and the inner annular sump 28d delivers the liquid to the center chordal sump 32. The liquid collection channels 46 in liquid collection region 38 divides the collected liquid equally between the chordal sumps 30 and 32 and the liquid collection channels 46 in liquid collection region 39 likewise divides the collected liquid equally between the chordal sumps 33 and 32.

The collector 626 also illustrates two of the different types of drain openings that have been previously described for allowing liquid to preferentially drain from the liquid collection channels 46 into the desired sump. In one embodiment, drain openings 94 are formed in the floor of the liquid collection channels, while in the other embodiment the liquid simply drains through the drain opening formed by an open end of the liquid collection channel 46.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A liquid mixing collector for capturing and mixing liquid descending from an overlying zone in a mass transfer or heat exchange column, the collector comprising:
   at least first and second sumps;
   at least one opening positioned in each of said first and second sumps through which liquid can drain when present in said first and second sumps;
   at least first and second liquid collection regions at least partially bounded by said first and second sumps;
   at least first and second sets of spaced apart liquid collection channels positioned in each of said first and second liquid collection regions, said first set of liquid collection channels being interspersed with said second set of liquid collection channels in each of said first and second liquid collection regions;

drain openings positioned in said liquid collection channels to allow liquid to drain from said liquid collection channels, when present therein, into said sumps, said first set of liquid collection channels in both of said first and second liquid collection regions being associated with said first sump so that liquid when present in said first set of liquid collection channels preferentially flows through the drain openings of the first set of liquid collection channels into said first sump, said second set of liquid collection channels in both of said first and second liquid collection regions being associated with said second sump so that liquid when present in said second set of liquid collection channels preferentially flows through the drain openings of the second set of liquid collection channels into said second sump;

ascending vapor flow channels in a spacing between the liquid collection channels in each of said liquid collection regions; and a plurality of upwardly extending deflectors having surfaces for directing liquid when descending from said overlying zone into said liquid collection channels.

2. The liquid collector of claim 1, including a first downcomer associated with said at least one opening in said first sump to direct liquid when draining through said at least one opening in said first sump into an underlying zone and a second downcomer associated with said at least one opening in said second sump to direct liquid when draining through said at least one opening in said second sump into an underlying zone.

3. The liquid collector of claim 1, wherein said first and second sumps are positioned within a common horizontal plane.

4. The liquid collector of claim 3, wherein said first and second sumps are chordal sumps.

5. The liquid collector of claim 4, wherein said first and second sumps each have opposed first and second ends.

6. The liquid collector of claim 5, including an annular sump in liquid flow communication with the first end of said first sump and an opposite second end of said second sump.

7. The liquid collector of claim 6, including a first flow restrictor positioned at the second end of said first sump to impede liquid flow between the second end of said first sump and the annular sump and a second flow restrictor positioned at the first end of the second sump to impede liquid flow between the first end of the second sump and the annular sump.

8. The liquid collector of claim 7, including a third flow restrictor positioned in the annular sump at a location adjacent the first end of the first sump to direct a portion of liquid, when present in said annular sump, into said first end of the first sump and a fourth flow restrictor positioned in the annular sump at a location adjacent the second end of the second sump to direct another portion of liquid, when present in said annular sump, into said second end of the second sump.

9. The liquid collector of claim 8, wherein said first and second sets of liquid collection channels extend in parallel relationship in a common horizontal plane.

10. The liquid collector of claim 9, wherein said first and second sumps extend in parallel and spaced-apart relationship and said first and second sets of liquid collection channels extend in perpendicular relationship to said first and second sumps.

11. The liquid collector of claim 10, wherein said first set of liquid collection channels are interspersed in an alternating fashion with said second set of liquid collection channels.

12. The liquid collector of claim 11, wherein said liquid collection channels have opposed ends and said drain openings comprise an open one of said opposed ends.

13. The liquid collector of claim 11, wherein said liquid collection channels each comprise spaced apart side walls and a connecting floor and wherein said liquid collection channels overlie said sumps.

14. The liquid collector of claim 13, wherein said drain openings are formed in said side walls of at least some of the liquid collection channels.

15. The liquid collector of claim 13, wherein said drain openings are formed in said floor of at least some of the liquid collection channels.

16. The liquid collector of claim 15, including a third chordal sump positioned in parallel and coplanar relationship to said first and second sumps.

17. The liquid collector of claim 5, including a third chordal sump positioned in parallel and coplanar relationship to said first and second sumps and wherein said liquid collection channels overlie said first, second and third sumps.

18. The liquid collector of claim 17, wherein said liquid collection channels each comprise side walls and a connecting floor and wherein said drain openings are formed in said side walls and/or said floor.

19. The liquid collector of claim 8, including a third chordal sump spaced between said first and second sumps in parallel and coplanar relationship to said first and second sumps and including at least one of said openings in said third chordal sump.

20. The liquid collector of claim 19, including additional flow restrictors at opposite ends of said third chordal sump to impeded liquid flow between said opposite ends and said annular sump.

21. The liquid collector of claim 1, wherein said first sump is an annular sump and said second sump is a chordal sump.

22. The liquid collector of claim 21, wherein one of said opening is located in said chordal sump and said annular sump is in liquid flow communication with opposite ends of said chordal sump to feed liquid, when present in said annular sump, to said opposite ends of said chordal sump.

23. The liquid collector of claim 1, wherein said first and second sumps are intersecting chordal sumps and including an annular sump in liquid flow communication with opposite ends of said first sump.

24. The liquid collector of claim 23, including a flow restrictor positioned at an area of intersection of said first and second sumps, wherein said flow restrictor extends diagonally across said area of intersection to redirect liquid when flowing in one portion of said second sump into one portion of said first sump and to redirect liquid when flowing in another portion of said second sump into another portion of said first sump, wherein at least one of said openings is positioned in both of said portions of said first sump.

25. The liquid collector of claim 24, including additional flow restrictors at opposite ends of said second chordal sump to impede liquid flow between said annular sump and said second chordal sump.

26. The liquid collector of claim 25, including additional flow restrictors positioned in said annular sump at locations adjacent the opposite ends of said first sump to direct portions of liquid, when present in said annular sump, into said opposite ends of said first sump.

27. The liquid collector of claim 26, wherein said first and second sets of liquid collection channels extend in parallel relationship in a common horizontal plane.

28. The liquid collector of claim 26, wherein said liquid collection regions comprise pie-shaped quadrants and wherein said first and second sets of liquid collection channels in each quadrant extend in opposite directions to the liquid collection channels in adjacent quadrants.

29. The liquid collector of claim 26, wherein said liquid collection channels have opposed ends and said drain openings comprise an open one of said opposed ends.

30. The liquid collector of claim 1, wherein said liquid collection channels are inclined downwardly in the direction of desired liquid flow to thereby impede flow in the opposite direction.

31. The liquid collector of claim 1, wherein said first and second sumps are annular sumps.

32. The liquid collector of claim 1, wherein said surfaces of said upwardly extending deflectors are positioned to shield against entry of said descending liquid into the vapor flow channels.

33. A method of collecting and mixing descending liquid in a mass transfer column, said method comprising the steps of:
collecting descending liquid in at least first and second sets of liquid collection channels positioned within each of at least first and second horizontally distributed liquid collection regions, said first set of liquid collection channels being interspersed with said second set of liquid collection channels in each of said at least two liquid collection regions;
preferentially directing a first quantity of liquid from said first set of said liquid collection channels in both of said first and second liquid collection regions into a first stamp and preferentially directing a second quantity of liquid from said second set of said liquid collection channels in both of said first and second liquid collection regions into a second sump;
draining said liquid from said first and second sumps.

34. The method of claim 33, wherein said steps of preferentially directing said first quantity of liquid into said first sump and preferentially directing said second quantity of liquid into said second sump comprises the step of directing generally equal amounts of liquid into said first and second sumps.

35. The method of claim 34, including the step of using angled deflectors to deflect descending liquid into said liquid collection channels.

36. The method of claim 35, including the step of passing ascending vapor upwardly through vapor passages located between said liquid collection channels.

37. The method of claim 36, including the step of positioning said angled deflectors to shield said vapor passages from said descending liquid.

38. The method of claim 34, wherein said step of preferentially directing said first and second quantities of liquid comprises the step of draining said liquid through drain openings positioned in said liquid collection channels.

39. The method of claim 34, including the steps of draining said liquid in the second sump into said first sump and draining said liquid in the first sump into an underlying zone within the mass transfer column.

40. The method of claim 33, wherein said step of draining said liquid from said first and second sumps comprises the steps of draining said liquid from said first sump into an inlet of a first downcomer and draining said liquid from said second sump into an inlet of a second downcomer.

41. The method of claim 40, including the step of delivering said liquid draining into said inlets of the first and second downcomers into an underlying zone within the mass transfer column.

* * * * *